United States Patent
Hanatani et al.

(10) Patent No.: US 7,449,095 B2
(45) Date of Patent: Nov. 11, 2008

(54) COATING FILM-FORMING METHOD

(75) Inventors: Minoru Hanatani, Kanagawa-ken (JP);
Koji Kamikado, Kanagawa-ken (JP);
Akihiko Shimasaki, Kanagawa-ken (JP);
Hideki Iijima, Kanagawa-ken (JP)

(73) Assignee: Kansai Paint Co., Ltd, Hyogo-ken (JP)

( * ) Notice: Subject to any disclaimer, the term of this patent is extended or adjusted under 35 U.S.C. 154(b) by 981 days.

(21) Appl. No.: 10/791,708

(22) Filed: Mar. 4, 2004

(65) Prior Publication Data
US 2005/0194253 A1 Sep. 8, 2005

(51) Int. Cl.
*C25D 13/06* (2006.01)
(52) U.S. Cl. ...................................... 204/505
(58) Field of Classification Search ................... 204/505
See application file for complete search history.

(56) References Cited

U.S. PATENT DOCUMENTS

| | | | |
|---|---|---|---|
| 4,094,852 A | 6/1978 | Sundermann et al. | |
| 4,713,442 A | 12/1987 | Woo et al. | |
| 6,660,385 B2 * | 12/2003 | Nishiguchi et al. | 428/413 |

FOREIGN PATENT DOCUMENTS

| | | |
|---|---|---|
| JP | 2001-19878 | 1/2001 |
| JP | 2002-60680 | 2/2002 |
| JP | 2002-275690 | 9/2002 |

* cited by examiner

*Primary Examiner*—Kishor Mayekar
(74) *Attorney, Agent, or Firm*—Fisher, Christen & Sabol

(57) ABSTRACT

A coating film-forming method, which method comprises coating a cationic electrodeposition coating composition onto a substrate, followed by heat curing to form a cured electrodeposition coating film, said cationic electrodeposition coating composition containing a base resin consisting of an amine-added epoxy resin (A) obtained by reacting an epoxy resin ($a_1$) with at least one modifying agent selected from the group consisting of a polyhydric polyol ($a_2$), an epoxy compound ($a_3$) of the polyhydric polyol and a cyclic ester compound ($a_4$), a polyphenol compound ($a_5$) and an amino group-containing compound ($a_6$), and a curing agent consisting of a blocked polyisocyanate curing agent (B) obtained by reacting at least one polyisocyanate compound ($b_1$) selected from the group consisting of an aromatic polyisocyanate compound and an alicyclic polyisocyanate compound with at least one blocking agent ($b_2$) selected from the group consisting of an oxime compound, aliphatic alcohols, aromatic alkyl alcohols and ether alcohols.

7 Claims, 2 Drawing Sheets

COATING FILM-FORMING METHOD

BACKGROUND OF THE INVENTION

1. Field of the Invention

The present invention relates to a coating film-forming method, particularly to a coating film-forming method, which comprises coating a cationic electrodeposition coating composition containing a specified base resin and a specified curing agent consisting of a blocked polyisocyanate curing agent onto a substrate and which is capable of obtaining a coated product having good properties in throwing power, electrodeposition suitability for an anti-corrosive steel plate or coating properties for a galvanized sheet, and anti-corrosive properties.

2. Description of Background Art

The cationic electrodeposition coating composition has good coating workability and is capable of forming a coating film showing high anti-corrosive properties, resulting in being widely used as a primer coating composition coated on an electrically conductive metal product such as an automobile body and the like, in which above properties are required. A many folds-structure of reinforcing materials for the purpose of increasing strength of the automobile body from the standpoint of improving collision safety in recent years makes difficult to flow through and may reduce a current density, resulting in making difficult a deposition of a coating film and in reducing anti-corrosive properties due to failure of coating. For the purpose of solving the above problem, forming a thick film on an inner plate area by raising a coating voltage is proposed.

The galvanized sheet is widely used as an anti-corrosive steel sheet from the standpoint of a low cost of the automobile body. On the other hand, an electrodeposition coating in a short period of time of 90 to 150 seconds is demanded from the standpoints of a saving of energy, saving of space and improvement in productivity in a coating line.

In view of the above problems, a high voltage electrodeposition coating was forced for the purpose of obtaining a high throwing power on the surface of a pouch area or inner plate, resulting in producing such problems that sparks generated during the electrodeposition coating of the galvanized sheet on the surface of an outer plate of the substrate may remain as pinholes after heat-curing of the coating film, resulting in reducing finished properties.

Japanese Patent Application Laid-Open No. 2001-19878 discloses a method of preparing a cationic electrodeposition coating composition capable of controlling development of pinholes due to gas generation on the galvanized sheet and obtaining a coating film showing high throwing power, and further discloses an electrodeposition coating film-forming method, which method comprises subjecting an electrodeposition coating composition controlled under such conditions that a minimum film-forming temperature of the cationic electrodeposition coating composition is in the range of ±5° C. of a predetermined electrodeposition coating temperature and an electrical conductivity on coating is in the range of 1000 to 1500 μS/cm to an electrodeposition coating at the predetermined electrodeposition coating temperature.

Japanese Patent Application Laid-Open No. 2002-275690 discloses a coating film-forming method, which method comprises coating a cationic electrodeposition coating composition under an effective voltage (V) of 230 V or less, the cationic electrodeposition coating composition having a uniform coating properties capable of ensuring an inner film thickness (μm) without increasing an outer plate film thickness and showing good finished properties of the galvanized sheet, and having a polarization resistance (a) per unit film thickness in the range of 120 to 300 kΩ·cm$^2$/μm and a coating composition deposition amount (b) per unit electrical quantity in the range of 50 to 150 mg/C in the cationic electrodeposition coating.

Japanese Patent Application Laid-Open No. 2002-60680 discloses a cationic electrodeposition coating composition showing improved properties in throwing power and resistance to pinhole development due to gas generation and further discloses the cationic electrodeposition coating composition containing an amine-modified epoxy resin and a blocked polyisocyanate curing agent as a resin component and containing an organic acid and a metal salt of the organic acid as the neutralizing agent under controlling a total amount of the organic acid and an equivalent ratio of the organic acid to the metal salt of the organic acid.

As above described, the cationic electrodeposition coating composition having both throwing power and electrodeposition coating suitability for the galvanized sheet is known in the art, but any cationic electrodeposition coating composition having throwing power, electrodeposition coating suitability for the galvanized sheet and good anti-corrosive properties in a short period of time of 90 to 150 seconds as an energizing time is not known in the art.

SUMMARY OF THE INVENTION

It is an object of the present invention to provide a coating film-forming method by use of a cationic electrodeposition coating composition having throwing power, electrodeposition coating suitability for the galvanized sheet and good anti-corrosive properties.

It is another object of the present invention is to provide a coated product obtained by the above method.

That is, the present invention relates to the following paragraphs 1 to 5:

1. A coating film-forming method, which method comprises coating a cationic electrodeposition coating composition onto a substrate, followed by heat curing to form a cured electrodeposition coating film, said cationic electrodeposition coating composition containing a base resin consisting of an amine-added epoxy resin (A) obtained by reacting an epoxy resin ($a_1$) with at least one modifying agent selected from the group consisting of a polyhydric polyol ($a_2$), an epoxy compound ($a_3$) of the polyhydric polyol and a cyclic ester compound ($a_4$), a polyphenol compound ($a_5$) and an amino group-containing compound ($a_6$), and a curing agent consisting of a blocked polyisocyanate curing agent (B) obtained by reacting at least one polyisocyanate compound ($b_1$) selected from the group consisting of an aromatic polyisocyanate compound and an alicyclic polyisocyanate compound with at least one blocking agent ($b_2$) selected from the group consisting of an oxime compound, aliphatic alcohols, aromatic alkyl alcohols and ether alcohols, 2. A coating film-forming method as defined in paragraph 1, wherein the amine-added epoxy resin (A) has a glass transition temperature in the range of −10 to 60° C., and the blocked polyisocyanate curing agent (B) has a glass transition temperature in the range of −10 to 50° C., 3. A coating film-forming method as defined in paragraph 1 or 2, wherein the cationic electrodeposition coating composition further contains a bismuth compound as an anti-corrosive agent, 4. A coating film-forming method as defined in any one of paragraphs 1 to 3, wherein one minute after starting of energizing on the electrodeposition coating, a resulting coating film has an electrical resistance in the range of 400 kΩ·cm² to 850 kΩ·cm², and 5. A coated product obtained by the method as defined in any one of paragraphs 1 to 4.

BRIEF DESCRIPTION OF THE DRAWINGS

In FIG. 2, 10 represents surface (H), 11 represents surface (A), 12 represents surface (C), 13 represents surface (E) and 14 represents surface (G). In FIGS. 1 and 2, 15 represents an opening of 8 mm in diameter. In FIG. 2, 20 represents a bath, 21 represents a cationic electrodeposition coating composition and 22 represents an anode.

DETAILED DESCRIPTION OF THE INVENTION

The coating film-forming method, which comprises coating a cationic electrodeposition coating composition containing a specified base resin preferably having a specified glass transition temperature and a specified curing agent preferably having a specified glass transition temperature onto a substrate and heat-curing, in the present invention makes it possible to obtain a cured electrodeposition coating film having high throwing power, and good properties in electrodeposition coating suitability for the galvanized sheet and anticorrosive properties with sufficient film thickness on a pouched area and inner plate area in a short period of time of 90 to 150 seconds on electrodeposition coating.

The use of such a cationic electrodeposition coating composition as the above cationic electrodeposition coating composition that a resulting coating film one minute after starting of energizing on the electrodeposition coating has an electrical resistance in the range of 400 kΩ·cm² to 850 kΩ·cm², preferably 480 kΩ·cm² to 650 kΩ·cm², makes it possible to easily obtain a cured electrodeposition coating film showing both high throwing power and electrodeposition coating suitability for the galvanized sheet.

Figure 1:
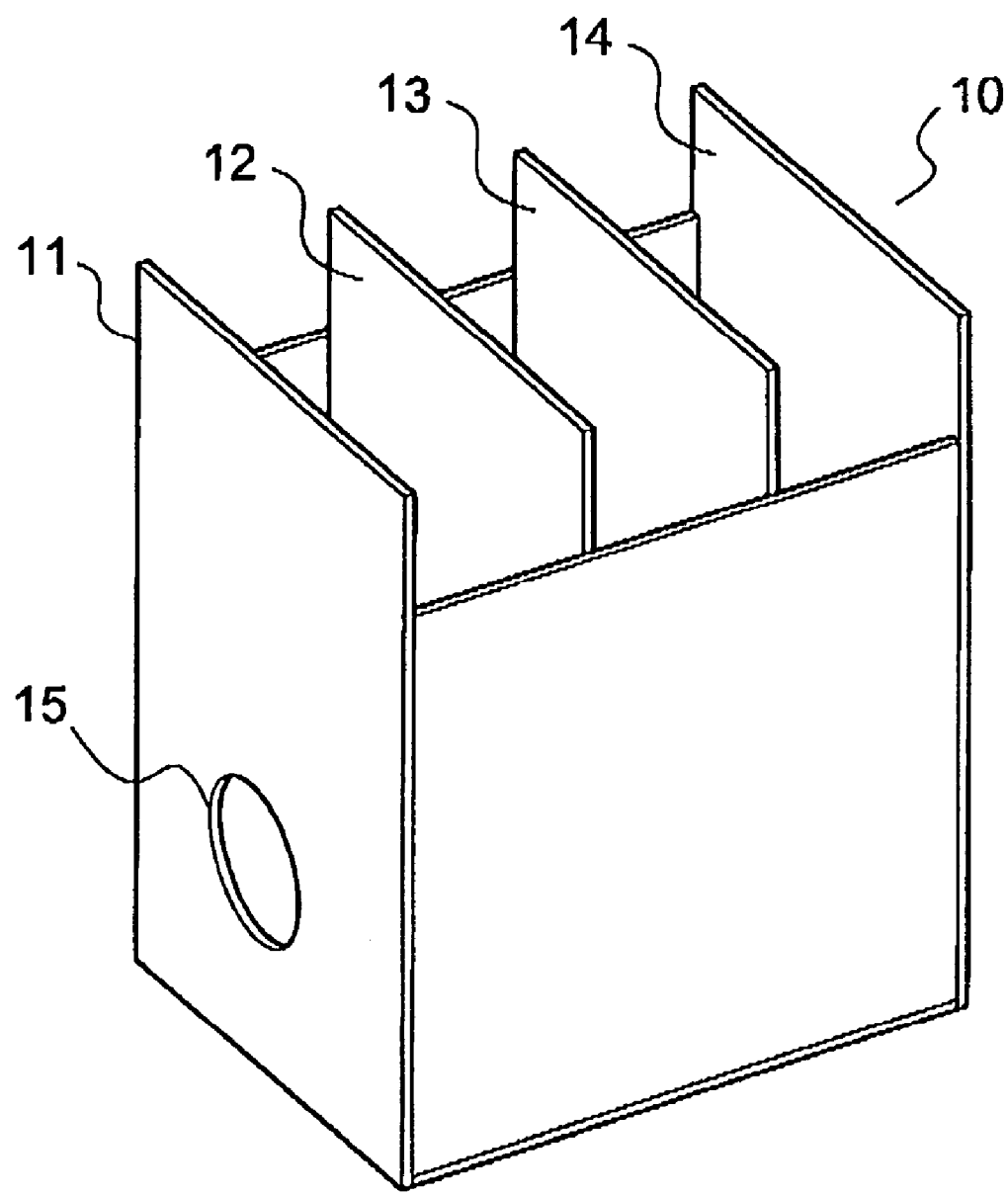
FIG. 1 is a schematic view of a jig used in a four sheets box throwing power coating test.
Figure 2:
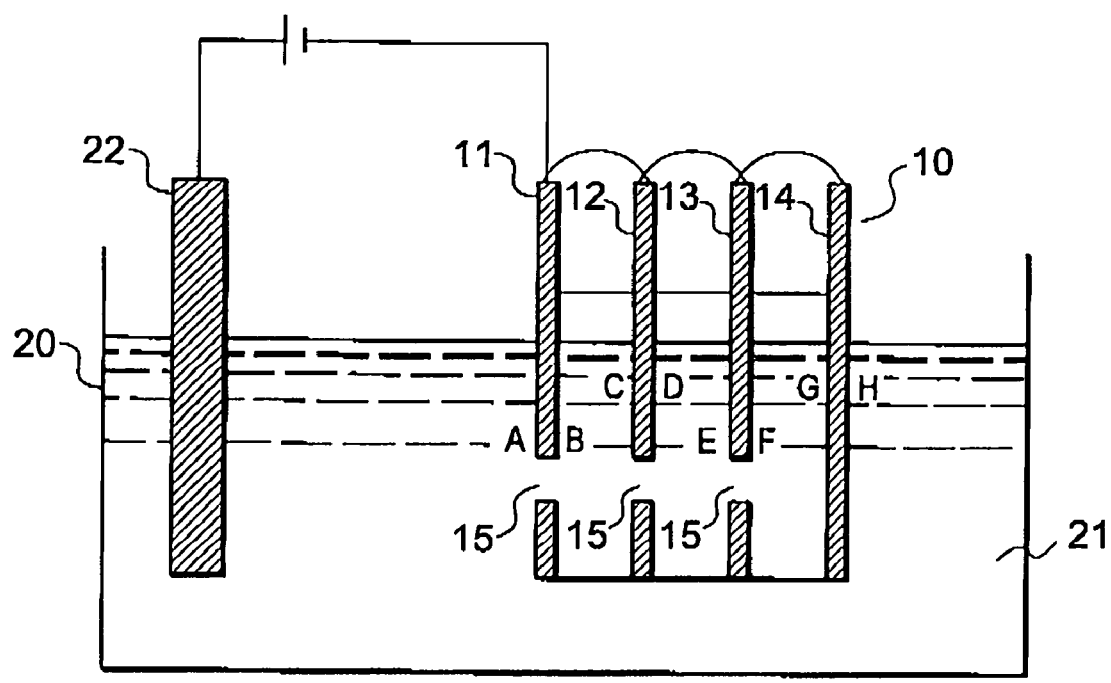
FIG. 2 is a wiring diagram for explaining the four sheets box throwing power coating test.

The throwing power is evaluated by a four sheets box test method. As shown in FIG. 1, a box formed by placing four sheets of zinc phosphate-treated cold-rolled steel sheet at an interval of 20 mm in parallel is used. Three steel sheets other than the steel sheet with surfaces (G) and (H) have an opening of 8 mm in diameter at a lower center respectively. The electrodeposition coating may be carried out according to a wiring diagram as shown in FIG. 2, and throwing power evaluation may be made from a film thickness on the nearest surface (A) from the anode and a film thickness on the most distant surface (G) from the anode.

The film-forming method of the present invention makes it possible to obtain such a throwing power that film thickness (μm) on the surface (G)/film thickness (μm) on the surface (A)=30 to 100%, preferably film thickness (μm) on the surface (G)/film thickness (μm) on the surface (A)=50 to 100%.

The coating film-forming method of the present invention also makes it possible to obtain such an electrodeposition coating suitability for the galvanized sheet that energizing a voltage, under which the above throwing power may be obtained, for example, 200 V or more, preferably 250 V or more, more preferably 300 V or more may develop no pinholes on the surface of the coating film.

As above described, the use of the cationic electrodeposition coating composition containing the specified base resin and the specified curing agent is essential for the purpose of obtaining both throwing power and electrodeposition coating suitability. The use of the cationic electrodeposition coating composition, which contains the specified resin preferably having a specified glass transition temperature and the specified curing agent preferably having a specified glass transition temperature, and which is more preferably such that the resulting coating film one minute after starting of energizing on the cationic electrodeposition coating has a specified electrical resistance, may further improve throwing power and electrodeposition coating suitability for the galvanized sheet.

The amine-added epoxy resin (A) used as the specified base resin and the blocked polyisocyanate curing agent (B) used as the specified curing agent in the cationic electrodeposition coating composition are explained hereinafter.

The amine-added epoxy resin (A) is a base resin obtained by reacting an epoxy resin (a₁) with at least one modifying agent selected from the group consisting of a polyhydric polyol (a₂), an epoxy compound (a₃) of the polyhydric polyol on a cyclic ester compound (a₄), a polyphenol compound (a₅) and an amino group-containing compound (a₆).

The epoxy resin (a₁) may preferably include an epoxy resin obtained by reacting a polyphenol compound with epihalohydrin, such as epichlorohydrin from the standpoints such as anti-corrosive properties of the coating film.

The polyphenol compound used for obtaining the epoxy resin may include ones known in the art, for example, bis(4-hydroxyphenyl)-2,2-propane (bisphenol A), 4,4-dihydroxybenzophenone, bis(4-hydroxyphenyl)methane (bisphenol F), bis(4-hydroxyphenyl)-1,1-ethane, bis(4-hydroxyphenyl)-1,1-isobutane, bis(4-hydroxy-tert-butyl-phenyl)-2,2-propane, bis(2-hydroxynaphthyl)methane, tetra(4-hydroxyphenyl)-1,1,2,2-ethane, 4,4-dihydroxydiphenylsulfone (bisphenol S), phenol novolak, cresol novolak, and the like.

The epoxy resin obtained by the reaction of the polyphenol compound with epichlorohydrin may particularly include ones derived from bisphenol A and represented by the following formula:

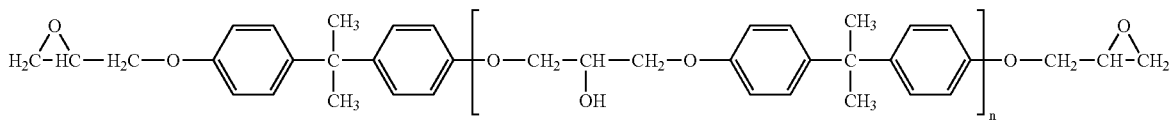

where n is 0 to 8.

The epoxy resin ($a_1$) has an epoxy equivalent in the range of 180 to 2,500, preferably 200 to 2,000, more preferably 400 to 1,500, and a number average molecular weight in the range of at least 200, particularly 400 to 4,000, more particularly 800 to 2,500.

Examples of commercially available trade names of the epoxy resin may include Epikote 828 EL, Epikote 1002, Epikote 1004 and Epikote 1007 (trade names marketed by Japan Epoxy Resin Co., Ltd.).

The polyhydric polyol ($a_2$) used as the modifying agent is, for example, a compound having at least two alcoholic hydroxyl groups in one molecule, and may include, for example, diols such as ethylene glycol, propylene glycol, 1,3-butylene glycol, 1,4-butanediol, 1,6-hexanediol, diethylene glycol, dipropylene glycol, cyclohexane-1,4-dimethylol, neopentyl glycol, polypropylene glycol, polyethylene glycol, triethylene glycol, hydrogenated bisphenol A and the like; triols such as glycerin, trimethylolethane, trimethylolpropane and the like; tetrols such as pentaerythritol, α-methylglucoside and the like; hexols such as sorbitol, dipentaerythritol and the like; and octols such as sucrose and the like.

The modifying agent may also include an epoxy compound ($a_3$) of the polyhydric polyol as obtained by reacting the polyhydric polyol ($a_3$) with epichlorohydrin.

The modifying agent may further include propylene oxide-modified bisphenol A diglycidyl, ethylene glycol oxide-modified bisphenol A diglycidyl and the like.

The cyclic ester compound ($a_4$) used as the modifying agent may include a compound represented by the following formula (1):

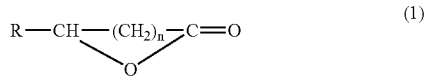

(1)

where R represents H or $CH_3$ and n represents 3 to 6, and specifically may include, for example, δ-valerolactone, ε-caprolactone, ζ-enolactone, η-caprolactone, γ-valerolactone, δ-caprolactone, ε-enolactone, ξ-caprolactone and the like. Of these, ε-caprolactone is particularly preferable.

In the addition reaction of the cyclic ester compound ($a_4$) with the epoxy resin ($a_1$), ring opening of the cyclic ester compound ($a_4$) represented by the formula (1) may be followed by reacting with a secondary hydroxyl group in the epoxy resin, imparting a primary hydroxyl group and resulting in that a methylene chain moiety due to lactone may impart plasticity to the epoxy resin.

An amount of the modifying agent to be reacted with the epoxy resin ($a_1$), i.e. an amount of at least one modifying agent selected from the group consisting of the polyhydric polyol ($a_2$), epoxy compound ($a_3$) of the polyhydric polyol and cyclic ester compound ($a_4$) may not be particularly limited, but may preferably be such that at least one modifying agent selected from the group consisting of the polyhydric polyol ($a_2$), epoxy compound ($a_3$) of the polyhydric polyol and cyclic ester compound ($a_4$) may be in the range of 5 to 40% by weight, preferably 10 to 35% by weight.

The polyphenol compound ($a_5$) may include, for example, phenol, cresols, p-octylphenol, nonylphenol, bisphenolpropane, bisphenolmethane, resorcinol, pyrocatechol, hydroquinone, P-tert-butylphenol, bisphenolsulfone, bisphenol ether, p-phenylphenols, bis(4-hydroxyphenyl)-2,2-propane, bis(4-hydroxyphenyl)-1,1-ethane, bis(4-hydroxyphenyl)-1,1-isobutane, 4,4'-dihydroxybenzophenone, bis(4-hydroxy-3-t-butylphenyl)-2,2-propane, bis(2-hydroxynaphthyl)methane, 1,5-dihydroxy-naphthalene and the like. These may be used alone or in combination.

The amine-added epoxy resin (A) may be prepared as follows.

A reactor is charged with the epoxy resin ($a_1$), at least one modifying agent selected from the group consisting of the polyhydric polyol ($a_2$), epoxy compound ($a_3$) of the polyhydric polyol and cyclic ester compound ($a_4$), and the polyphenol compound ($a_5$), followed by adding an organic solvent, a basic amino compound catalyst such as dimethylbenzylamine, tributylamine, triethylamine and the like, and tetraethylammonium bromide, tetrabutylammonium bromide, tetraethylammonium hydroxide, triphenylethylphosphonium iodide and the like to obtain a modified epoxy resin.

The preparation of the modified epoxy resin may be carried out by adding the catalyst in an amount of 1 to 10,000 ppm based on a total solid content of the epoxy resin ($a_1$), at least one modifying agent selected from the group consisting of the polyhydric polyol ($a_2$), epoxy compound ($a_3$) of the polyhydric polyol and cyclic ester compound ($a_4$) and polyphenol compound ($a_5$), followed by heating at a temperature of about 50° C. to about 200° C. for about 30 minutes to about 10 hours.

Thereafter, the amino group-containing compound ($a_6$) is added to the modified epoxy resin to obtain an amine-added epoxy resin (A).

The amino group-containing compound ($a_6$) to react with the modified epoxy resin is a cationic properties-imparting component which introduces amino group into the epoxy resin and cationizes the epoxy resin, and may include one having at least one active hydrogen to react with the epoxy resin.

The amino group-containing compound ($a_6$) may include, for example, mono- or di-alkylamine such as monomethylamine, dimethylamine, monoethylamine, diethylamine, monoisopropylamine, diisopropylamine, monobutylamine, dibutylamine and the like; alkanolamine such as monoethanolamine, diethanolamine, mono(2-hydroxypropyl)amine, di(2-hydroxypropyl)amine, tri(2-hydroxypropyl)amine, monomethylaminoethanol, monoethylaminoethanol and the like; alkylene polyamine such as ethylenediamine, propylenediamine, butylenediamine, hexamethylenediamine, tetraethylenepentamine, pentaethylenehexamine, diethylaminopropylamine, diethylenetriamine, triethylenetetramine and the like, and a ketiminized product of these polyamines; an alkyleneimine such as ethyleneimine, propyleneimine and the like; a cyclic amine such as piperazine, morpholine, pyrazine and the like, and the like.

The amino group-containing compound ($a_6$) may be reacted with the epoxy group of the modified epoxy resin under the conditions of a temperature in the range of about 30° C. to about 150° C. for 30 minutes to 150 minutes. Preferably, a compound containing a primary amine or N-hydroxyalkyl secondary amine of the above amines may be reacted with ketone, aldehyde, or carboxylic acid at 100° C. to 230° C. to be modified to aldimine, ketimine, oxazoline or imidazoline, followed by reacting with the epoxy group of the modified epoxy resin at about 80° C. to about 200° C. for about one hour to about 5 hours.

An amount of the amino group-containing compound ($a_6$) may preferably be such that an amine value of the amine-added epoxy resin (A) may be in the range of 20 to 80 mg KOH/g, preferably 25 to 70 mg KOH/g. The amine-added epoxy resin (A) may preferably have a weight average molecular weight in the range of about 1,000 to about 10,000.

The amine-added epoxy resin (A) obtained as above has a glass transition temperature in the range of −10° C. to 60° C.

The glass transition temperature in the present invention is a value measured by use of a Differential Thermal Analyzer, or measured by use of DSC-5200 (trade name, marketed by Seiko Instruments Inc., Differential Scanning Calorimeter) at a temperature-raising speed of 10° C./min.

Blocked Polyisocyanate Curing Agent (B)

The blocked polyisocyanate curing agent (B) used as the curing agent in the present invention may be obtained by reacting at least one polyisocyanate compound ($b_1$) selected from the group consisting of an aromatic polyisocyanate compound and an alicyclic polyisocyanate compound with at least one blocking agent ($b_2$) selected from the group consisting of an oxime compound, aliphatic alcohols, aromatic alkyl alcohols and ether alcohols.

The aromatic diisocyanate may include, for example, 1,3- or 1,4-phenylene diisocyanate, 2,4- or 2,6-tolylene diisocyanate (TDI), crude TDI, 2,4'- and/or 4,4'-diphenylmethane diisocyanate (MDI), 4,4'-diisocyanatobiphenyl, 3,3'-dimethyl-4,4'-diisocyanatobisphenyl, 3,3'-dimethyl-4,4'-diisocyanatodiphenylmethane, crude MDI, 1,5-naphthylene diisocyanate, 4,4',4''-triphenylmethanetriisocyanate, m- or p-isocyanatophenylsulfonyl isocyanate and the like.

Of these, diphenylmethane-2,4'-diisocyanate, diphenylmethane-4,4'-diisocyanate (MDI) and crude MDI are preferable.

The crude MDI is a mixture mainly containing diphenylmethane-4,4'-diisocyanate, diphenylmethane-2,4'-diisocyanate and polymethylene polyphenyl polyisocyanate, and may include trade names, for example, Cosmonate M-50, M-200, M-100, M-300 etc. (trade names, all marketed by Mitsui Chemicals, Inc.); Sumidur 44V10, 44V20, 44V40, etc. (trade names, all marketed by Sumika Bayel Urethane Co., Ltd.); Lupranate M-12, M-12S, M-20, M-20S, etc. (trade names, all marketed by BASF AG. Germany); Mondur MR (LIGHT), etc. (trade name, marketed by Bayer Ltd.), and the like.

The alicyclic polyisocyanate compound may include, for example, isophorone diisocyanate (IPD), dicyclohexylmethane-4,4'-diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5- and/or 2,6-norbornene diisocyanate and the like.

In addition, the modified product of the above polyisocyanate compound may include a modified product of polyisocyanate, for example, a modified MDI such as urethane-modified MDI, carbodiimide-modified MDI and trihydrocarbicphosphate-modified MDI, urethane-modified TDI, biuret-modified HDI, isocyanurate-modified HDI, isocyanurate-modified IPDI and the like; mixtures thereof, for example, a mixture of modified MDI and urethane-modified TDI as isocyanate group-containing prepolymer.

The blocking agent is such that addition of the blocking agent to an isocyanate group in the polyisocyanate compound blocks the isocyanate group, and a resulting blocked polyisocyanate compound is stable at normal temperatures, but heating at a temperature in the range of about 100° C. to 200° C., preferably 120° C. to 150° C. may dissociate the blocking agent to regenerate a free isocyanate group. The smaller the molecular weight of the dissociated blocking agent the less the resulting heating loss, resulting in reducing gum and soot in a drying oven.

The blocking agent may include, for example, an oxime compound such as methyl ethyl ketoxime, cyclohexanone oxime and the like; aliphatic alcohols such as n-butanol, 2-ethylhexanol and the like; aromatic alkyl alcohols such as phenylcarbinol, methylphenylcarbinol and the like; ether alcohols such as ethylene glycol monopropyl ether, ethylene glycol monobutyl ether, ethylene glycol monoethyl ether and the like; a lactam compound such as ε-caprolactam, γ-butyrolactam and the like; a phenol compound such as phenol, p-t-butylphenol, cresol and the like; a low molecular weight amide compound such as n-methylacetamide, n-ethylacetamide, n-methylpropionamide, n-methylformamide and the like; and the like.

Of these, the oxime compound, aliphatic alcohols, aromatic alkyl alcohols and ether alcohols are preferable from the standpoints of throwing power and electrodeposition coating suitability for the galvanized sheet in the cationic electrodeposition coating composition of the present invention.

A mixing amount of the blocking agent is so as to be reacted at a ratio of 1:1 to 1:1.3 to NCO group of the polyisocyanate. A ratio more than 1.3 may reduce anti-corrosive properties of the coating film due to a remaining blocking agent. A ratio less than 1.0 may reduce stability of the coating composition due to a remaining NCO group.

The blocked polyisocyanate curing agent (B) of the cationic electrodeposition coating composition used in the film-forming method of the present invention may preferably be obtained by reacting at least one polyisocyanate compound ($b_1$) selected from the group consisting of an aromatic polyisocyanate compound and an alicyclic polyisocyanate compound with at least one blocking agent ($b_2$) selected from the group consisting of an oxime compound, aliphatic alcohols, aromatic alkyl alcohols and ether alcohols, so as to have a glass transition temperature in the range of 45 to 65° C.

The cationic electrodeposition coating composition contain the amine-added epoxy resin (A) and the blocked polyisocyanate curing agent as the essential components, and may optionally contain an organotin compound and a coating composition additive such as a color pigment, extender pigment, anti-corrosive pigment, organic solvent, water, neutralizing agent, pigment dispersant, coating film surface controlling agent and the like.

The organotin compound may promote dissociation of the blocking agent used in the blocked polyisocyanate curing agent (B) and functions as a curing catalyst, and may include, for example, an organotin oxide such as dibutyltin oxide, dioctyltin oxide and the like; aliphatic or aromatic carboxylic acid salt of dialkyltin, for example, dibutyltin dilaurate, dioctyltin dilaurate, dibutyltin diacetate, dioctyltin dibenzoate, dibutyltin dibenzoate and the like. Of these dialkyltin aromatic carboxylic acid salt is preferable from the standpoint of low temperature curing properties.

A mixing amount of the organotin compound in the cationic coating composition of the present invention may not particularly be limited and may widely be varied depending on performances required for the coating composition, but is usually in the range of 0 (zero) to 8 parts by weight, preferably 0.05 to 5 parts by weight per 100 parts by weight of a resin solid content in the coating composition.

The cationic electrodeposition coating composition may be coated onto the surface of a predetermined substrate by an electrodeposition coating. The electrodeposition coating may be carried out by energizing under the conditions of a solid content concentration of about 5 to 40% by weight by diluting with deionized water, a pH in the range of 5.0 to 9.0, an electrodeposition coating bath temperature of 15 to 35° C., a loading voltage of 100 to 400 V, coating substrate as a cathode, energizing time of 30 seconds to 3 minutes, anode to cathode area ratio (A/C) 8/1 to 1/8, and distance between anode and cathode 10 cm to 300 cm.

An electrodeposition coating film thickness may not particularly be limited, but may generally be in the range of 10 to 40 μm, preferably 15 to 30 μm. A heat curing temperature is generally in the range of about 100 to about 200° C., preferably about 120° C. to about 170° C.

The coating film-forming method, which method comprises coating the cationic electrodeposition coating composition containing the specified base resin and the specified curing agent, makes it easily possible to form a coating film having an electrical resistance in the range of 400 kΩ·cm$^2$ to 850 kΩ·cm$^2$, preferably 480 kΩ·cm$^2$ to 650 kΩ·cm$^2$ one minute after starting of energizing on the electrodeposition coating, and makes it possible to obtain a cured electrodeposition coating film having high throwing power, and good properties in electrodeposition coating suitability for the galvanized sheet with sufficient film thickness on a pouched area and inner plate area in a short period of time of 90 to 150 seconds on electrodeposition coating.

The present invention can provide the following particular effects.

The coating film-forming method, which comprises coating a cationic electrodeposition coating composition containing a specified base resin preferably having a specified glass transition temperature and a specified curing agent preferably having a specified glass transition temperature onto a substrate and heat-curing, in the present invention makes it possible to obtain a coated product with a cured electrodeposition coating film having high throwing power, and good properties in electrodeposition coating suitability for the galvanized sheet and anti-corrosive properties with sufficient film thickness on a pouched area and inner plate area in a short period of time of 90 to 150 seconds on electrodeposition coating.

Further, the use of such a cationic electrodeposition coating composition as the above cationic electrodeposition coating composition that a resulting coating film one minute after starting of energizing on the electrodeposition coating has an electrical resistance in the range of 400 kΩ·cm$^2$ to 850 kΩ·cm$^2$, makes it possible to easily obtain a cured electrodeposition coating film showing both high throwing power and electrodeposition coating suitability for the galvanized sheet.

Reasons why the above effects may be provided, may be guessed as follows.

An emulsion as a component constituting the cationic electrodeposition coating composition may be such that a core moiety of the emulsion is composed of the curing agent and a shell moiety is composed of the base resin, and the amino group of the base resin is neutralized to form an emulsion particle. Thus, it is guessed that a combination of the specified base resin and the specified curing agent, and preferably the glass transition temperature in the predetermined range may provide such effects that (1) formation of a coating film having a sufficient electrical resistance in a short period of time after starting energizing results in that a current consumed in the outer plate may also be consumed for forming a coating film onto the inner plate, and in that the throwing power may be improved, and that (2) hardness resisting to sparks on energizing due to the curing agent in the core moiety makes breakage of the coating film difficult, and on the other hand, even if gas holes should develop, softness of the shell moiety may repair pinholes, resulting in improving electrodeposition coating suitability for the galvanized sheet.

The film-forming method of the present invention makes possible an electrodeposition coating in a short period of time, resulting in improvement in productivity, saving of the coating line space and saving of energy. In addition thereto, the resulting high throwing power may result in that the pouch area and inner plate shows good anti-corrosive properties, that the galvanized sheet of the outer plate is free of pinholes, and that a coated product showing good finish appearance can be obtained.

EXAMPLE

The present invention is explained more in detail by reference to Examples, and should not be limited thereto only. In Examples, "%" and "part" represent "% by weight" and "part by weight" respectively.

Preparation Example of Base Resin No. 1

Preparation Example 1

A reactor equipped with a thermometer, stirrer, reflux condenser and nitrogen gas inlet was charged with 525 parts of propylene oxide-modified bisphenol A diglycidyl ether (Note 1), 342 parts of bisphenol A, and 36 parts of a 80% effective component methyl isobutyl ketone solution of a ketimine between monoethanolamine and methyl isobutyl ketone while introducing nitrogen gas, followed by reacting at 160° C. until the epoxy group disappear, adding 665 parts of bisphenol diglycidyl ether having an epoxy equivalent of about 190 and 232 parts of the 80% effective component methyl isobutyl ketone solution of a ketimine between monoethanolamine and methyl isobutyl ketone, reacting at 140° C. until an epoxy group content reaches 0.27 m mol/g to obtain an epoxy resin solution having a number average molecular weight of about 1,500, diluting and cooling down to 100° C. with 365 parts of ethylene glycol monobutyl ether, adding 167 parts of an 80% effective component methyl isobutyl ketone solution of a diketimine between diethylenetriamine and methyl isobutyl ketone, reacting at 100° C. until increase of viscosity stops to obtain a base resin No. 1 having a solid content of 80% and a glass transition temperature of 23° C.

(Note 1): propylene oxide-modified bisphenol A diglycidyl ether (trade name, Glyciale BPP-350, marketed by Sanyo Chemical Industries, Ltd., epoxy equivalent about 340).

Preparation Example 2

(Preparation of Base Resin No. 2)

The same reactor as in Preparation Example 1 was charged with 450 parts of ethylene oxide-modified bisphenol A diglycidyl ether (Note 2) having an epoxy equivalent of about 300, 342 parts of bisphenol A, and 36 parts of a 80% effective component methyl isobutyl ketone solution of a ketimine between monoethanolamine and methyl isobutyl ketone while introducing nitrogen gas, followed by reacting at 160° C. until the epoxy group disappears, adding 665 parts of bisphenol A diglycidyl ether having an epoxy equivalent of about 190 and 232 parts of a 80% effective component methyl isobutyl ketone solution of a ketimine between monoethanolamine and methyl isobutyl ketone, reacting at 140° C. until an epoxy group content reaches 0.29 m mol/g to obtain an epoxy resin solution having a number average molecular weight of about 1,500, diluting and cooling down to 100° C. with 350 parts of ethylene glycol monobutyl ether, adding 167 parts of a 80% effective component methyl isobutyl ketone solution of a diketimine between diethylenetriamine and methyl isobutyl ketone, and reacting at 100° C. until increase of viscosity stops to obtain a base resin No. 2 having a solid content of 80% and a glass transition temperature of 28° C.

(Note 2): ethylene oxide-modified bisphenol A glycidyl ether (Glyciale BPE-300, trade name, marketed by Sanyo Chemical Industries, Ltd., epoxy equivalent about 300).

Preparation Example 3

(Preparation of Base Resin No. 3)

A flask equipped with a stirrer, thermometer, nitrogen gas inlet and reflux condenser was charged with 518 parts of epoxy resin obtained by reaction of bisphenol A with epichlorohydrin and having a number average molecular weight of 370 and an epoxy equivalent of 185, followed by adding 57 parts of bisphenol A and 0.2 part of dimethylbenzylamine, reacting at 120° C. until the epoxy equivalent reaches 250, adding 213 parts of $\epsilon$-caprolactone and 0.03 part of tetrabutoxytitanium, heating up to 170° C., sampling with time while keeping at that temperature, examining an amount of unreacted $\epsilon$-caprolactone by an infrared absorption spectral measurement, until a degree of conversion reaches 98% or more, adding 148 parts of bisphenol A and 0.4 part of dimethylbenzylamine, reacting at 130° C. until the epoxy equivalent reaches 936, adding 257.4 parts of methyl isobutyl ketone, 25.6 parts of diethylamine and 68.3 parts of diethanolamine, reacting at 80° C. for 2 hours, and diluting with methyl ethyl ketone to obtain a base resin No. 3 having a solid content of 80% and a glass transition temperature of 38° C.

Preparation Example 4

(Preparation of Base Resin No. 4)

A reactor was charged with 222 parts of isophorone diisocyanate, followed by slowly dropping 113.1 parts of methyl ethyl ketoxime while keeping a reaction temperature at 30 to 40° C. by an external cooling to obtain a partly blocked polyisocyanate.

Next, 83.7 parts of the above partly blocked polyisocyanate was mixed with 500 parts of the base resin No. 3 obtained in Preparation Example 3, followed by reacting at 100° C. under a nitrogen stream until absorption of isocyanate group disappear by an infrared absorption spectral measurement, and diluting with diethylene glycol monobutyl ether to obtain a base resin No. 4 having a solid content of 80% and a glass transition temperature of 44° C.

Preparation Example 5

(Preparation of Base Resin No. 5)

A mixture of 1010 g of Epikote 828EL (trade name, marketed by Japan Epoxy Resin Co., Ltd., epoxy resin), 390 g of bisphenol A and 0.2 g of dimethylbenzylamine was reacted at 130° C. so as to be an epoxy equivalent of 800, followed by adding 160 g of diethanolamine and 65 g of a ketiminized product of diethylenetriamine, reacting at 120° C. for 4 hours, adding 355 g of butylcellosolve to obtain a base resin No. 5 having an amine value of 67 mg KOH/g, a solid content of 80% and a glass transition temperature of 90° C.

Preparation Example 6

(Preparation of Curing Agent No. 1)

A reactor was charged with 270 parts of Cosmonate M-200 (Note 3) and 25 parts of methyl isobutyl ketone, followed by heating up to 70° C., slowly adding 15 parts of 2,2-dimethylolbutyric acid, dropping 118 parts of ethylene glycol monobutyl ether, reacting at 70° C. for one hour, cooling down to 60° C., adding 152 parts of propylene glycol, sampling with time while keeping at that temperature and confirming that absorption of unreacted isocyanate group disappeared by an infrared absorption spectral measurement to obtain a curing agent No. 1 having a solid content of 80% and a glass transition temperature of 5° C.

(Note 3) Cosmonate M-200: trade name, marketed by Mitsui Chemicals, Inc., crude MDI.

Preparation Example 7

(Preparation of Curing Agent No. 2)

A reactor was charged with 174 parts of tolylene diisocyanate, followed by heating up to 70° C., slowly adding 15 parts of 2,2-dimethylolbutyric acid, dropping 118 parts of ethylene glycol monobutyl ether, reacting at 70° C. for one hour, cooling down to 60° C., adding 152 parts of propylene glycol, sampling with time while keeping at that temperature and confirming that absorption of unreacted isocyanate group disappeared by an infrared absorption spectral measurement to obtain a curing agent No. 2 having a solid content of 80% and a glass transition temperature of 10° C.

Preparation Example 8

(Preparation of Curing Agent No. 3)

A reactor was charged with 222 parts of isophorone diisocyanate and 99 parts of methyl isobutyl ketone, followed by heating up to 50° C., slowly adding 174 parts of methyl ethyl ketoxime, heating up to 60° C., sampling with time while keeping at that temperature and confirming that absorption of unreacted isocyanate group disappeared by an infrared absorption spectral measurement, and controlling a solid content with an organic solvent to obtain a curing agent No. 3 having a solid content of 80% and a glass transition temperature of 8° C.

Preparation Example 9

(Preparation of Curing Agent No. 4)

A reactor was charged with 50 parts of hexamethylene diisocyanate, followed by dropping 30 parts of methyl ketoxime and 10 parts of trimethylolpropane at 40 to 60° C., heating at 80° C. for one hour, sampling with time while keeping at that temperature and confirming that absorption of unreacted isocyanate group disappeared by an infrared absorption spectral measurement, and controlling a solid content with an organic solvent to obtain a curing agent No. 4 having a solid content of 80% and a glass transition temperature of –19° C.

Preparation Examples of Emulsion Nos. 1-9 (EM Nos. 1-9) for Use in Cationic Electrodeposition Coating Compositions Preparation Example 10

(Preparation of EM No. 1)

A mixture of 87.5 parts (resin solid content 70 parts) of the base resin No. 1, 37.5 parts (resin solid content 30 parts) of the curing agent No. 1 and 13 parts of 10% acetic acid was uniformly stirred, followed by dropping deionized water while strongly stirring over about 15 minutes to obtain a EM No. 1 having a solid content of 34% as an emulsion for use in a cationic electrodeposition coating composition.

Preparation Examples 11-18

(Preparation of EM No. 2 to EM No. 9)

Preparation Example 10 was duplicated except for respective formulations as shown in Table 1 to obtain EM No. 2 to No. 9 having a solid content of 34% as an emulsion for use in a cationic electrodeposition coating composition respectively. In Table 1, the solid content is parenthesized.

TABLE 1

| | | Preparation Examples | | | | | | | | |
|---|---|---|---|---|---|---|---|---|---|---|
| | | 10 | 11 | 12 | 13 | 14 | 15 | 16 | 17 | 18 |
| | Emulsion | No. 1 | No. 2 | No. 3 | No. 4 | No. 5 | No. 6 | No. 7 | No. 8 | No. 9 |
| Formulations | Base Resin No. 1 | 87.5 | | | | 87.5 | 87.5 | | | |
| | (solid content 80%) | (70) | | | | (70) | (70) | | | |
| | Base Resin No. 2 | | 87.5 | | | | | | | |
| | (solid content 80%) | | (70) | | | | | | | |
| | Base Resin No. 3 | | | 87.5 | | | | | | |
| | (solid content 80%) | | | (70) | | | | | | |
| | Base Resin No. 4 | | | | 87.5 | | | | | |
| | (solid content 80%) | | | | (70) | | | | | |
| | Base Resin No. 5 | | | | | | | 87.5 | 87.5 | 87.5 |
| | (solid content 80%) | | | | | | | (70) | (70) | (70) |
| | Curing Agent No. 1 | 37.5 | 37.5 | 37.5 | 37.5 | | | | | |
| | (solid content 80%) | (30) | (30) | (30) | (30) | | | | | |
| | Curing Agent No. 2 | | | | | 37.5 | | 37.5 | | |
| | (solid content 80%) | | | | | (30) | | (30) | | |
| | Curing Agent No. 3 | | | | | | 37.5 | | 37.5 | |
| | (solid content 80%) | | | | | | (30) | | (30) | |
| | Curing Agent No. 4 | | | | | | | | | 37.5 |
| | (solid content 80%) | | | | | | | | | (30) |
| | 10% Acetic acid | 13 | 13 | 13 | 13 | 13 | 13 | 13 | 13 | 13 |
| | Deionized water | 156 | 156 | 156 | 156 | 156 | 156 | 156 | 156 | 156 |
| 34% Emulsions | | 294 | 294 | 294 | 294 | 294 | 294 | 294 | 294 | 294 |
| | | (100) | (100) | (100) | (100) | (100) | (100) | (100) | (100) | (100) |

Preparation of Pigment-Dispersed Paste

Preparation Example 19

A mixture of 5.83 parts (solid content 3.5 parts) of 60% solid content quaternary ammonium salt type epoxy resin, 14.5 parts of titanium oxide, 7.0 parts of purified clay, 1.0 part of bismuth hydroxide, 1.0 part of organotin, 0.4 part of carbon black and 20.1 parts of deionized water was dispersed in a ball mill for 20 hours, followed by taking out to obtain a pigment-dispersed paste (solid content 27.4 parts) having a solid content of 55%.

Example 1

To 294 parts (solid content 100 parts) of the emulsion No. 1 were added 49.8 parts (solid content 27.4 parts) of the pigment-dispersed paste No. 1 and 293.2 parts of deionized water to prepare a 20% solid content cationic electrodeposition coating composition No. 1 (solid content 127.4 parts).

Examples 2-6

Example 1 was duplicated except that formulations shown in Table 2 were used respectively to obtain cationic electrodeposition coating compositions No. 2 to No. 6.

Comparative Examples 1-3

Example 1 was duplicated except that formulations shown in Table 3 were used respectively to obtain cationic electrodeposition coating compositions No. 7 to No. 9.

Coating Test

Respective cationic electrodeposition coating compositions obtained in the above Examples and Comparative Examples were subjected to cationic electrodeposition coating onto a cold-rolled steel sheet or a galvanized sheet (0.8× 150×70 mm, chemically treated with Palbond #3020, trade name, marketed by Nippon Parkerizing Co., Ltd., zinc phosphate treating agent, respectively), followed by heat curing to prepare coating test panels respectively. Respective coating test panels were subjected to tests of throwing power, electrodeposition coating suitability for a galvanized sheet, and anti-corrosive properties as follows.

Coating composition formulations, coating film properties and test results for cationic electrodepositions No. 1 to No. 6 (Examples) are shown in Table 2, in which Tg represents a glass transition temperature.

TABLE 2

| | | Examples | | | | | |
|---|---|---|---|---|---|---|---|
| Cationic electrodeposition coating composition | | 1 No. 1 | 2 No. 2 | 3 No. 3 | 4 No. 4 | 5 No. 5 | 6 No. 6 |
| Coating composition formulations | EM No. 1 (Tg: base resin 23° C., curing agent 5° C.) | 294 | | | | | |
| | EM No. 2 (Tg: base resin 28° C., curing agent 5° C.) | | 294 | | | | |
| | EM No. 3 (Tg: base resin 38° C., curing agent 5° C.) | | | 294 | | | |
| | EM No. 4 (Tg: base resin 44° C., curing agent 5° C.) | | | | 294 | | |
| | EM No. 5 (Tg: base resin 23° C., curing agent 10° C.) | | | | | 294 | |
| | EM No. 6 (Tg: base resin 23° C., curing agent 8° C.) | | | | | | 294 |
| | pigment-dispersed paste | 49.8 | 49.8 | 49.8 | 49.8 | 49.8 | 49.8 |
| | deionized water | 293 | 293 | 293 | 293 | 293 | 293 |
| | 20% cationic electrodeposition coating composition | 637 | 637 | 637 | 637 | 637 | 637 |
| Coating film properties | electrical resistance of a coating film one minute after starting of energizing (kΩ·cm²) | 600 | 630 | 640 | 680 | 600 | 600 |
| Energizing time (90 seconds) Coating voltage (250 V) | throwing power (Note 4)   surface A (μm) | 15 | 15 | 15 | 14 | 15 | 15 |
| | surface G (μm) | 7 | 7 | 8 | 8 | 7 | 7 |
| | G/A (%) | 47 | 47 | 53 | 57 | 47 | 47 |
| | electrodeposition coating suitability for galvanized sheet (Note 5) | ○ | ○ | ○ | ○ | ○ | ○ |
| Energizing time (150 seconds) Coating voltage (200 V) | throwing power (Note 4)   surface A (μm) | 18 | 18 | 18 | 17 | 18 | 18 |
| | surface G (μm) | 10 | 10 | 11 | 11 | 10 | 10 |
| | G/A (%) | 56 | 56 | 61 | 65 | 56 | 56 |
| | electrodeposition coating suitability for galvanized sheet (Note 5) | ○ | ○ | ○ | ○ | ○ | ○ |
| Anti-corrosive properties (Note 6) | | ◎ | ◎ | ◎ | ◎ | ◎ | ○ |

Coating composition formulations, coating film properties and test results for cationic electrodeposition No. 7 to No. 9 (Comparative Examples) are shown in Table 3, in which Tg represents a glass transition temperature.

TABLE 3

| | | Comparative Examples | | |
|---|---|---|---|---|
| Cationic electrodeposition coating composition | | 1 No. 7 | 2 No. 8 | 3 No. 9 |
| Coating composition formulations | EM No. 7 (Tg:base resin 90° C., curing agent 10° C.) | 294 | | |
| | EM No. 8 (Tg:base resin 90° C., curing agent 8° C.) | | 294 | |
| | EM No. 9 (Tg:base resin 90° C., curing agent −19° C.) | | | 294 |
| | pigment-dispersed paste | 49.8 | 49.8 | 49.8 |
| | deionized water | 293 | 293 | 293 |
| | 20% cationic electrodeposition coating composition | 637 | 637 | 637 |
| Coating film properties | electrical resistance of a coating film one minute after starting of energizing (kΩ·cm²) | 750 | 750 | 700 |
| Energizing time (90 seconds) Coating voltage (250 V) | throwing power (Note 4)   surface A (μm) | 12 | 12 | 15 |
| | surface G (μm) | 7 | 7 | 8 |
| | G/A (%) | 58 | 58 | 53 |
| | electrodeposition coating suitability for galvanized sheet (Note 5) | X | X | X |
| Energizing time (150 seconds) | throwing power (Note 4)   surface A (μm) | 14 | 14 | 18 |
| | surface G (μm) | 9 | 9 | 11 |

TABLE 3-continued

|  | | Comparative Examples | | |
|---|---|---|---|---|
|  | | 1 | 2 | 3 |
| Cationic electrodeposition coating composition | | No. 7 | No. 8 | No. 9 |
| Coating voltage (200 V) | G/A (%) | 64 | 64 | 61 |
|  | electrodeposition coating suitability for galvanized sheet (Note 5) | X | X | X |
|  | Anti-corrosive properties (Note 6) | ○ | ○ | Δ |

(Note 4) Throwing power: A jig for a four sheets box throwing power test method was prepared by use of the above chemically treated cold-rolled steel sheet as shown in FIG. 1, followed by carrying out an electrodeposition coating under the conditions of a bath temperature of 28° C., coating voltage as shown in Tables, an energizing time of 90 seconds or 150 seconds according to a wiring diagram as shown in FIG. 2, heat curing at 170° C. for 20 minutes, and evaluating throwing power from a film thickness (μm) on the surface (A) as an outer plate, film thickness (μm) on the surface (G) as an inner plate and a ratio (%) of film thickness (μm) on the surface (G)/film thickness (μm) on the surface (A).

(Note 5) Electrodeposition Coating Suitability for Galvanized Sheet: The chemically treated galvanized sheet was dipped in an electrodeposition coating bath as a cathode, followed by carrying ort an electrodeposition coating under the conditions of a bath temperature of 28° C., a coating voltage as shown in Tables and energizing time of 90 seconds or 150 seconds, heat curing at 170° C. for 20 minutes, and measuring a number of pinholes within 10×10 cm of the test panel.

○: No pinholes developed with good finished properties.

Δ: 3 to 5 pinholes developed.

X: 10 or more pinholes developed.

(Note 6) Anti- corrosive properties: Cross cuts were formed by use of a knife on the surfaces of a test panel prepared by subjected a chemically treated cold-rolled steel sheet to an electrodeposition coating so as to reach the coating substrate, followed by subjecting to a 840 hours salt water spray test in accordance with JIS Z-2371, and evaluating development of rust from the cross cut, and width of blisters as follows.

⊚: maximum width of rust and blisters less than 2 mm (one side).

○: maximum width of rust and blisters less than 3 mm (one side).

Δ: maximum width of rust and blisters 3 mm or more and less than 4 mm from cut (one side).

X: maximum width of rust and blisters 4 mm or more from cut (one side).

What is claimed is:

1. A coating film-forming method, which method comprises coating a cationic electrodeposition coating composition onto a substrate by an electrodeposition coating, followed by heat curing to form a cured electrodeposition coating film, said cationic electrodeposition coating composition containing a base resin consisting of an amine-added epoxy resin (A) obtained by reacting an epoxy resin ($a_1$) with a modifying agent consisting of an epoxy compound ($a_3$) of a polyhydric polyol and with a polyphenol compound ($a_5$) to form a modified epoxy resin, followed by adding an amino group-containing compound ($a_6$) to the modified epoxy resin for reacting, and a curing agent consisting of a blocked polyisocyanate curing agent (B) obtained by reacting at least one polyisocyanate compound ($b_1$) selected from the group consisting of an aromatic polyisocyanate compound and an alicyclic polyisocyanate compound with at least one blocking agent (b2) selected from the group consisting of an oxime compound, aliphatic alcohols, aromatic alkyl alcohols and ether alcohols.

2. A coating film-forming method as claimed in claim 1, wherein the amine-added epoxy resin (A) has a glass transition temperature in the range of –10 to 60° C., and the blocked polyisocyanate curing agent (B) has a glass transition temperature in the range of –10 to 50° C.

3. A coating film-forming method as claimed in claim 2, wherein the cationic electrodeposition coating composition further contains a bismuth compound as an anti-corrosive agent.

4. A coating film-forming method as claimed in claim 2, wherein a coating film formed in one minute from starting of energizing on carrying out the electrodeposition coating has an electrical resistance in the range of 400 kΩ·cm$^2$ to 850 kΩ·cm$^2$.

5. A coating film-forming method as claimed in claim 1, wherein the cationic electrodeposition coating composition further contains a bismuth compound as an anti-corrosive agent.

6. A coating film-forming method as claimed in claim 5, wherein a coating film formed in one minute from starting of energizing on carrying out the electrodeposition coating has an electrical resistance in the range of 400 kΩ·cm$^2$ to 850 kΩ·cm$^2$.

7. A coating film-forming method as claimed in claim 1, wherein a coating film formed in one minute from starting of energizing on carrying out the electrodeposition coating has an electrical resistance in the range of 400 kΩ·cm$^2$ to 850 kΩ·cm$^2$.

* * * * *